H. J. BLAKESLEE.
METER TESTING BLOCK.
APPLICATION FILED OCT. 29, 1915.
1,192,844.
Patented Aug. 1, 1916.
3 SHEETS—SHEET 1.
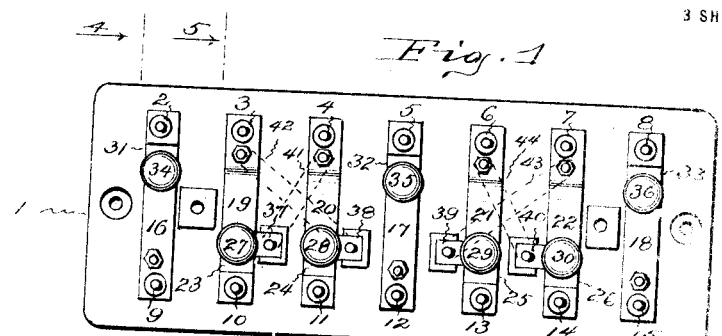
Fig. 1
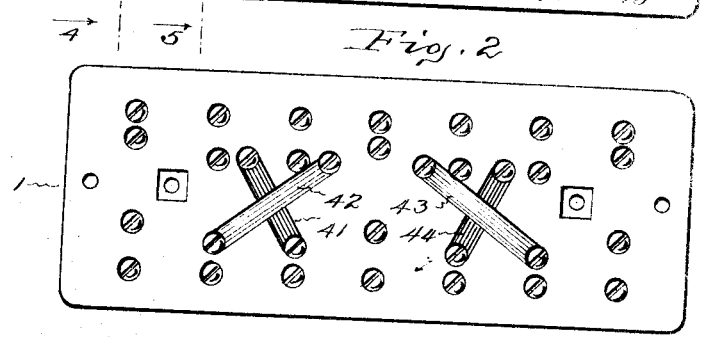
Fig. 2
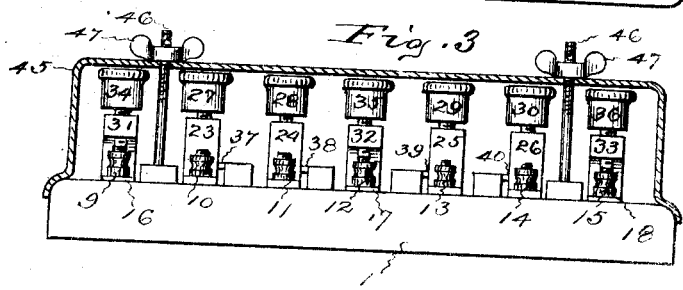
Fig. 3
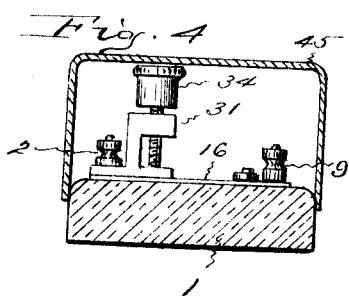
Fig. 4
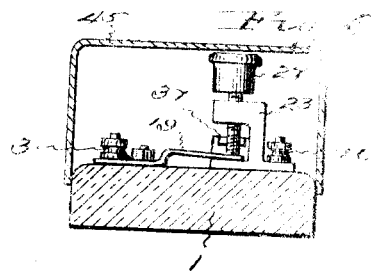

H. J. BLAKESLEE.
METER TESTING BLOCK.
APPLICATION FILED OCT. 29, 1915.

1,192,844.

Patented Aug. 1, 1916.
3 SHEETS—SHEET 3.

Inventor:
Henry J. Blakeslee
Harry R. Williams
atty

UNITED STATES PATENT OFFICE

HENRY J. BLAKESLEE, OF HARTFORD, CONNECTICUT.

METER-TESTING BLOCK.

1,192,844.  Specification of Letters Patent.  Patented Aug. 1, 1916.

Application filed October 29, 1915. Serial No. 58,540.

*To all whom it may concern:*

Be it known that I, HENRY J. BLAKESLEE, a citizen of the United States, residing at Hartford, in the county of Hartford and State of Connecticut, have invented a new and useful Improvement in Meter-Testing Blocks, of which the following is a specification.

This invention relates to those cut-out blocks designed to be installed adjacent to and connected with electric meters, which are constructed in such manner that the meters can be easily and quickly tested when it is so desired, without interrupting the flow of current to the customers.

The object of the invention is the production of a compact and cheap block of this character having the current carrying parts provided with binding posts and nuts for the permanent connection of the ends of the service and load wires and of the ends of the meter leads, and provided with binding screws for the temporary connection of the testing instrument leads, the manipulation of which screws for the attachment of the testing instruments automatically resulting in such a condition of the circuits that the desired test can readily be made without liability of accident or interruption of the service. This object is attained by providing the ends of the conducting plates on the insulating base with suitable binding posts and nuts for the permanent attachment of the terminals of the regular service, load and meter wires, and with adjustable binding screws for the temporary attachment of the leads to the testing instruments, some of these binding screws being so arranged that normally they act to keep the meter current circuit closed, but as they are manipulated for connecting the testing instrument leads they first permit the current to be shunted to the customer's load and then the meter current circuit to completely open in such manner that the test can be made without danger of short circuiting any of the lines or allowing such flow of the current as will injure any of the apparatus and without interfering with the flow of the current to the customer.

This invention is adaptable for use with two or three wire D. C. or A. C. single or polyphase circuits, and for testing meters with full line potential or part potential, or with storage battery, or phantom loads, as the conditions require.

Figure 6:
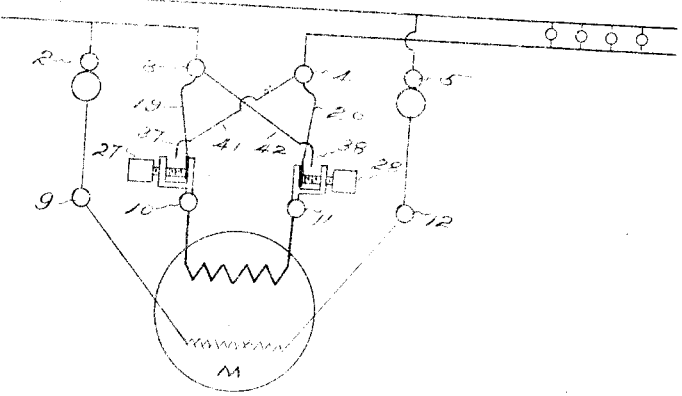
Figure 7:
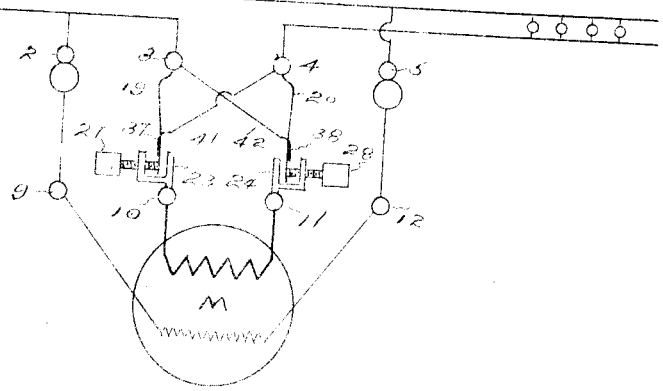
Figure 8:
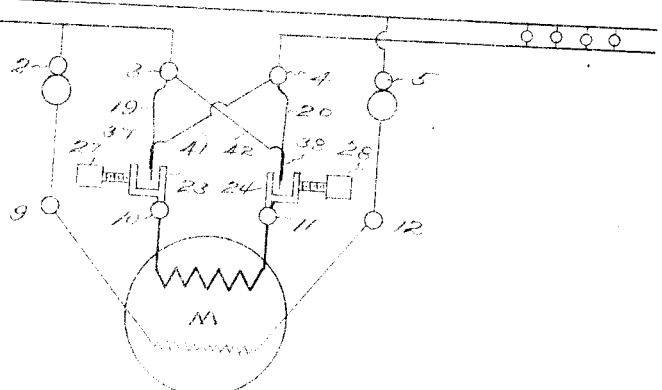
Figure 9:
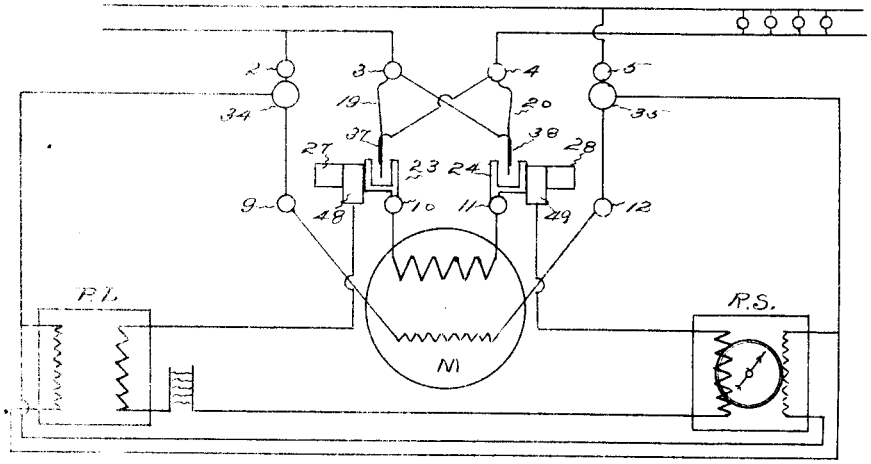
Figure 10:
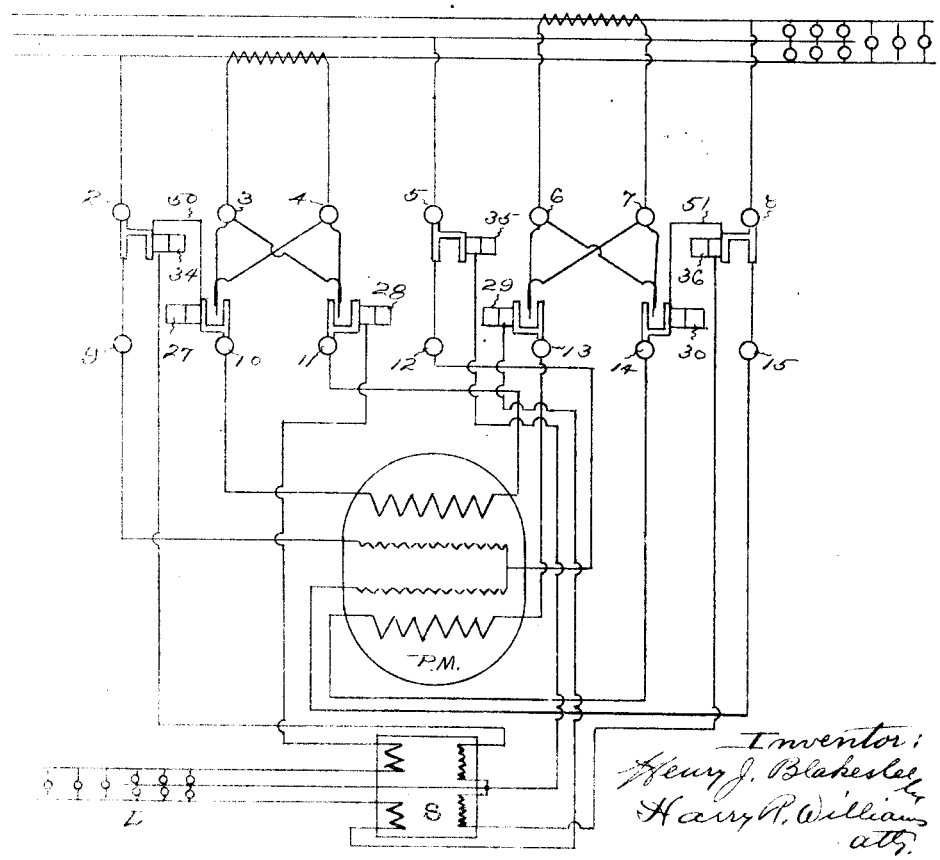

Figure 1 of the accompanying drawings shows a plan of a meter testing connection block which embodies this invention, the cover being omitted. Fig. 2 shows a view of the under side of the block. Fig. 3 shows a front view of the block with the cover in section. Fig. 4 shows a section on the plane indicated by the dotted line 4—4 on Fig. 1. Fig. 5 shows a section on the plane indicated by the dotted line 5—5 on Fig. 1. Fig. 6 shows a diagrammatic representation of a two-wire circuit with the meter connections through the block in normal service condition. Fig. 7 is a similar view showing the connections on the block with the load shunted around the meter which is still connected in the circuit. Fig. 8 shows the meter current coil entirely disconnected but the load not interrupted. Fig. 9 shows the connections when the meter is being tested by a standard and a phantom load, the regular customer's load being uninterrupted. Fig. 10 shows the connections when a polyphase meter is being compared with a standard test meter.

The block illustrated has connections for the attachment of the terminals and meter leads of a polyphase circuit. The base 1 of this block is desirably made of porcelain with binding posts and nuts 2, 3, 4, 5, 6, 7 and 8 along the top near one side and binding posts and nuts 9, 10, 11, 12, 13, 14 and 15 along the top near the other side. The posts 2 and 9, 5 and 12, 8 and 15, are respectively connected by rigid conducting plates 16, 17 and 18. The binding posts 3, 4, 6 and 7 are connected with spring conducting plates 19, 20, 21 and 22, and the binding posts 10, 11, 13 and 14 are connected with yoke-shaped blocks 23, 24, 25, 26 provided with thumb screws 27, 28, 29 and 30. When these thumb screws are turned down, as they are in normal use, they force the ends of the spring conductors into engagement with the lower parts of the yokes and keep conducting paths closed between the binding posts to which they are connected. Yoke-shaped blocks 31, 32 and 33, bearing thumb screws 34, 35 and 36, are mounted on the rigid conducting plates 16, 17 and 18. Fastened on the top of the base adjacent to and projecting over the free ends of the spring plates 19, 20, 21 and 22 are plates 37, 38, 39 and 40. On the underside of the base the plate 37 is connected by a plate 41 with the binding post 4, the plate 38 is connected by the plate 42 with the binding post 3, the plate 39 is connected by the plate 43 with the binding post 7, and the plate 40 is connected by the plate 44 with the binding post 6.

In normal use the thumb screws 27, 28, 29 and 30 are turned down so as to hold the ends of the spring plates 19, 20, 21 and 22 engaged with the yokes 23, 24, 25, 26. Then there are direct electric paths between the binding posts 3 and 10, 4 and 11, 6 and 13, 7 and 14. When these screws are turned out the ends of the spring plates 19, 20, 21 and 22 spring up and engage with the plates 37, 38, 39 and 40. Under these conditions there still are conducting paths through the spring plates from the posts 3, 4, 6 and 7 to the posts 10, 11, 13 and 14, but there are also conducting paths through the spring plates and the cross connections between the posts 3 and 4 and between the posts 6 and 7. Further turning out of the thumb screws disengages them from the spring plates and opens the paths to the posts 10, 11, 13 and 14. However, it is not until the posts 3 and 4 and 6 and 7 are cross connected that the connections to the posts 10, 11, 13 and 14 are opened.

A cover 45 is arranged to inclose the connections, and screws 46 with thumb nuts 47 are provided for securing the cover in place. The screws are perforated for sealing wires, but only when the thumb screws are turned down and the normal connections made can the cover be sealed in place. In other words, if the normal service circuits are opened at any point the cover cannot be put on and sealed.

If the block is to be used with a two-wire circuit the binding posts 6 and 13, 7 and 14, 8 and 15 and the connections between them may be omitted.

When the block is used in connection with a two-wire circuit the potential-coil terminals of the meter M are secured to the binding posts 9 and 12, and the binding posts 2 and 5 are connected across the line. The meter current-coil leads are connected with the binding posts 10 and 11 and through the posts 3 and 4 with the line. Under normal conditions, as shown in Fig. 6, the screws 27 and 28 are turned down so as to force the ends of the spring plates 19 and 20 into contact with the yokes that are connected with the binding posts 10 and 11. As indicated, under these conditions there is no connection between the binding posts 3 and 4 except through the meter current-coil. If the meter is to be tested the screws 27 and 28 are turned out. This allows the ends of the springs 19 and 20 to rise into contact with the plates 37 and 38, as shown in Fig. 7, and establish a cross connection between the binding posts 3 and 4 through the plates 41 and 42. As indicated, under these conditions while the load is shunted past the meter, the meter current-coil is still in the circuit as a result of the contact of the screws 27 and 28 with the ends of the spring plates. On further turning out of the screws, as shown in Fig. 8, all connection from the line to the meter current-coil is broken. When the screws are turned out the load is automatically short circuited, or shunted around the meter, before it is possible to open the connections to the current-coil of the meter, so that at no time is the flow of service current to the customer interrupted.

In order to make the test with a phantom load, the current-coil of the meter being cut out as described, the potential terminals of a rotary standard R. S. and of the phantom load P. L. are connected with the binding posts 2 and 5 through the medium of the thumb screws 34 and 35, and the current-coil terminals 48 and 49 of the rotary standard and phantom load are connected with the yokes 23 and 24 to which the meter current-coil terminals are connected, by means of the thumb screws 27 and 28. These terminals 48 and 49 are made of such thickness that when they are clamped in position the ends of the screws 27 and 28 cannot by any possible chance get into contact with the ends of the spring conductors 19 and 20. Fig. 9.

In Fig. 10 the block is diagrammatically represented as interposed between a polyphase circuit and meter, with the current for the current-coils of the meter taken from current transformers on the mains. Under these conditions one current transformer C. T. has its terminals connected with the binding posts 3 and 4, and one of the current-coils of the meter P. M. has its terminals connected with the binding posts 10 and 11. The terminals of the other current transformer C. T. are connected with the binding posts 6 and 7, and the terminals of the other current-coil of the meter are connected with the binding posts 13 and 14. The potential-coils of the meter are connected on one side with the line through the binding posts 2 and 9, on the other side through the binding posts 8 and 15, and in the middle through the binding posts 5 and 12. When connected in this manner in order to test a meter with current from the line the current-coils of the meter are disconnected by turning out the screws 27, 28, 29 and 30. This is accomplished, as previously described, without interrupting the flow of current to the load. The binding posts 2 and 10 are then bridged by a connection 50 and the binding posts 8 and 14 are bridged by a connection 51. The terminals of these connecting pieces are bound by the screws 34 and 27, 36 and 30. The terminals of the potential-coils of the standard S. are bound at one side under the screw 34, at the other side under the screw 36, and at the middle under the screw 35. The terminals of the current-coils of the standard are connected by the screws 28 and 29 with the binding posts 11 and 13 so as to put them in series with the current-coils of the meter. The other terminals of the current-coils of the standard are connected with the known load L. in the usual manner.

With this block different types of meters, used under the various commercial conditions, may be conveniently and safely tested in the desired way without in any case interfering with the service to the customer, and the cover cannot be secured in place unless the circuits are in normal service condition. This block can be made so compact that it can be located in a meter case in place of the usual lead connectors and thus provide the meter with means whereby it can be quickly shunted when a test is desired.

The invention claimed is;

1. A meter testing block having a base, binding posts along one side for the attachment of line terminals, binding posts along the other side for the attachment of meter leads, conductors connecting the respective binding posts, at least one of said conductors being of spring metal, a binding screw engaging and holding the spring conductor so that the conducting path is normally closed through it, and a cross conductor with one end connected with a line terminal post and with its other end normally out of engagement with said spring conductor but adapted to be engaged by said spring conductor when its binding screw is turned so that the conductor springs up and opens the normal circuit, and thereby automatically closing the line circuit when the meter circuit is opened.

2. A meter testing block having binding posts along one side for the attachment of line terminals, binding posts along the other side for the attachment of meter leads, rigid conductors permanently connecting the binding posts for the potential circuit, spring conductors normally connecting the binding posts for the current circuit, binding screws engaging the spring conductors and holding them in closed position, and cross conductors at one end connected with the binding posts to which the spring conductors are connected, and at the other end arranged to be engaged by the spring conductors when the binding screws are turned so as to release the spring conductors and allow them to spring up and open the normal circuit.

3. A meter testing block having binding posts along one side for the attachment of line terminals, binding posts along the other side for the attachment of meter leads, rigid conductors permanently connecting the binding posts for the potential circuit, binding screws for the attachment of testing instrument potential leads with the rigid conductors, spring conductors normally connecting the binding posts for the current circuit, binding screws for the attachment of testing instrument current leads, connected with the spring conductors, said last mentioned binding screws, when turned down, engaging the spring conductors and holding them with the current circuit closed, and when turned up, allowing the spring conductors to spring up and open the current circuit, and cross conductors with one end connected with the binding posts to which the spring conductors are connected and with their other ends adapted to be engaged by the spring conductors when the binding screws allow the spring conductors to spring up.

4. A meter testing block having binding posts along one side for the attachment of line terminals, binding posts along the other side for the attachment of meter leads, conductors permanently connecting the binding posts for the potential circuit, spring conductors normally connecting the binding posts for the current circuit, binding screws engaging the spring conductors and holding them in closed position, and a cross conductor with one end connected with a binding post to which a spring conductor is connected and with its other end adapted to be engaged by the other spring conductor when its binding screw is turned so that it may spring up, said binding screws being capable of complete disengagement from the spring conductors, and testing instrument lead terminals of such thickness that they can be connected by said binding screws without possibility of the binding screws coming in contact with the spring conductors when the leads are attached.

5. A meter testing block having binding posts along one side for the attachment of line terminals, binding posts along the other side for the attachment of meter leads, conductors permanently connecting the binding posts for the potential circuit, spring conductors connecting the binding posts for the current circuit, and binding screws, when turned in, engaging the spring conductors and holding them in closed position, and when turned out and disengaged from the spring conductors, releasing them so that they will spring out and open the current circuit.

6. A meter testing block having contacts adapted to be connected with meter leads, spring conductors adapted to be connected with service leads, cross conductors adapted to be connected with service leads, and binding screws adapted to force the spring conductors into engagement with said contacts, or allow the spring conductors to yield from said contacts into engagement with said cross conductors.

7. A meter testing block having binding screws, spring conducting members, cross conductors and testing terminal connectors combined to connect a meter and a main line circuit so that when the binding screws are turned in and the testing terminal connectors left out the meter will be normally connected in the main circuit, but when the binding screws confine the testing terminal conductors the meter will be disconnected from the main circuit, but the main circuit will be uninterrupted.

8. A meter testing block having a base, with means for the attachment of main line terminals and meter leads, a spring conductor adapted to electrically connect a line terminal and a meter lead, a binding screw normally holding the spring conductor with the path between the line and terminal and meter lead closed, and a cross conductor connected with another line terminal and arranged to be engaged by the spring conductor when it is released by the binding screw so as to electrically connect said line terminals.

HENRY J. BLAKESLEE.